(12) United States Patent
Young

(10) Patent No.: US 12,107,832 B2
(45) Date of Patent: Oct. 1, 2024

(54) SYSTEM FOR ESTABLISHING SECURE COMMUNICATION CHANNELS FOR PERIPHERAL HARDWARE DEVICES

(71) Applicant: BANK OF AMERICA CORPORATION, Charlotte, NC (US)

(72) Inventor: Michael Robert Young, Davidson, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 335 days.

(21) Appl. No.: 17/864,940

(22) Filed: Jul. 14, 2022

(65) Prior Publication Data
US 2024/0022543 A1     Jan. 18, 2024

(51) Int. Cl.
*H04L 9/40*     (2022.01)

(52) U.S. Cl.
CPC .......... *H04L 63/0272* (2013.01); *H04L 63/18* (2013.01)

(58) Field of Classification Search
CPC ............................ H04L 63/0272; H04L 63/18
See application file for complete search history.

(56) References Cited

U.S. PATENT DOCUMENTS

| | | | |
|---|---|---|---|
| 7,310,730 B1 * | 12/2007 | Champagne | ........ H04L 63/0428 713/153 |
| 8,060,074 B2 | 11/2011 | Danford et al. | |
| 8,396,465 B2 | 3/2013 | Danford et al. | |
| 8,626,147 B2 | 1/2014 | Danford et al. | |
| 8,811,970 B2 | 8/2014 | Danford et al. | |
| 9,813,379 B1 | 11/2017 | Shevade et al. | |
| 9,875,359 B2 | 1/2018 | Wang et al. | |
| 9,942,787 B1 | 4/2018 | Tillotson | |
| 10,560,431 B1 | 2/2020 | Chen et al. | |
| 10,666,606 B2 | 5/2020 | Voegele et al. | |
| 10,862,777 B2 | 12/2020 | Richards et al. | |
| 10,938,784 B2 | 3/2021 | Patterson et al. | |
| 2005/0198412 A1 | 9/2005 | Pedersen et al. | |
| 2009/0327517 A1 | 12/2009 | Sivasubramanian et al. | |

(Continued)

*Primary Examiner* — Beemnet W Dada
(74) *Attorney, Agent, or Firm* — Moore & Van Allen PLLC; Nicholas C. Russell

(57) ABSTRACT

Systems, computer program products, and methods are described herein for establishing secure communication channels for peripheral hardware devices. The present invention is configured to receive, via a computing device system comprising at least one peripheral hardware device, a request to begin a virtual interaction between the computing device system and a virtual network system configured to establish connections and transmit information across or between systems. The invention may then establish the virtual interaction via a first communication channel and then receive a request to establish a second communication channel, where the second communication channel comprises a direct communication channel between the at least one peripheral hardware device and the virtual network system that is separate and distinct from the first communication channel. The invention may then involve establishing, via an interaction management application, the second communication channel between the at least one peripheral hardware device and the virtual network system.

17 Claims, 5 Drawing Sheets

(56) References Cited

U.S. PATENT DOCUMENTS

| | | |
|---|---|---|
| 2012/0287833 A1* | 11/2012 | Babin ............... H04W 52/0232 |
| | | 370/311 |
| 2013/0067085 A1 | 3/2013 | Hershko et al. |
| 2014/0282050 A1 | 9/2014 | Quinn et al. |
| 2014/0282817 A1 | 9/2014 | Singer et al. |
| 2017/0177396 A1 | 6/2017 | Palermo et al. |
| 2017/0180216 A1* | 6/2017 | Peng ....................... H04L 49/15 |
| 2017/0264622 A1 | 9/2017 | Cooper et al. |
| 2019/0379683 A1* | 12/2019 | Overby ............... H04W 12/122 |
| 2020/0252375 A1 | 8/2020 | Chen et al. |
| 2021/0119890 A1 | 4/2021 | Richards et al. |

* cited by examiner

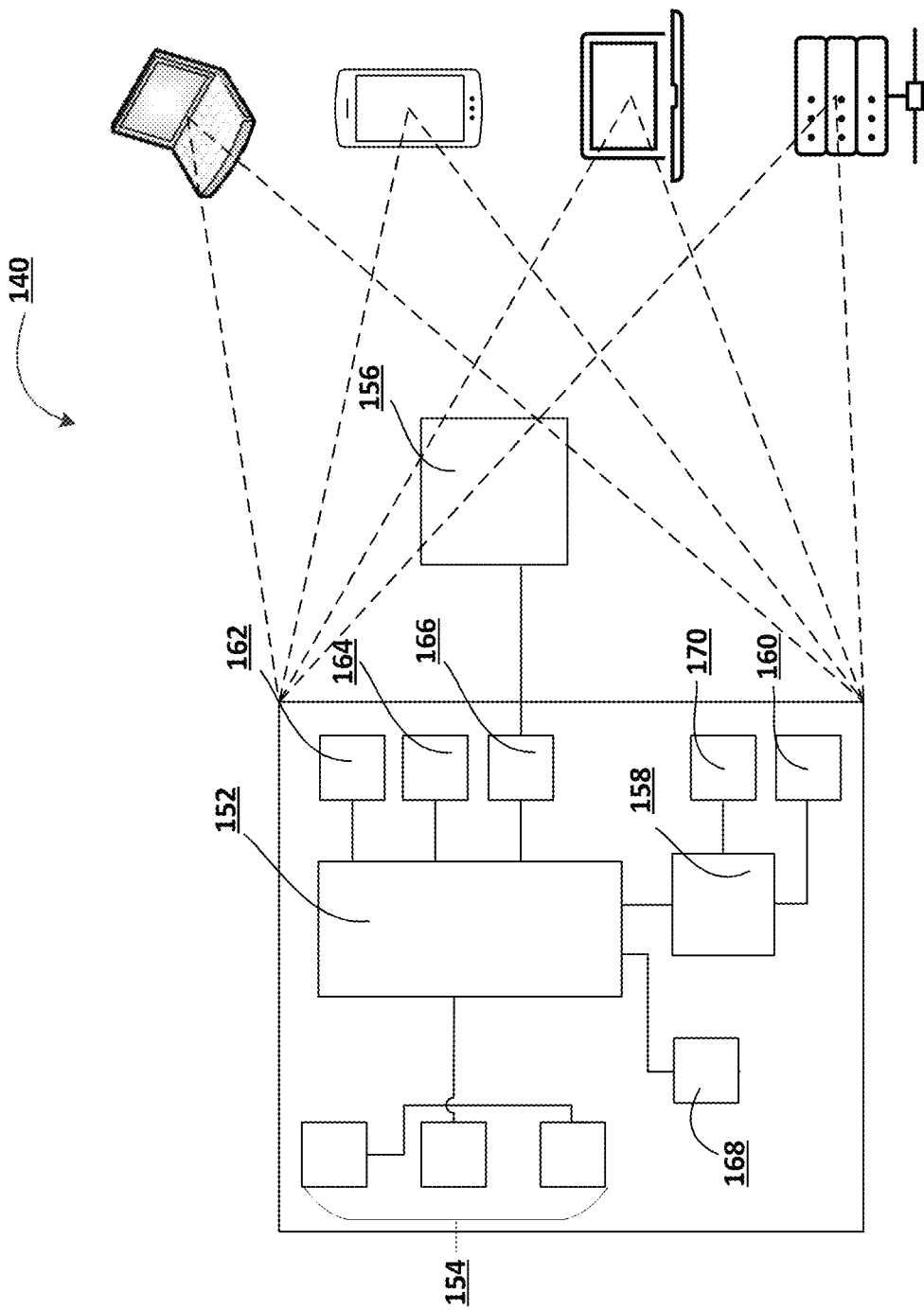

SYSTEM FOR ESTABLISHING SECURE COMMUNICATION CHANNELS FOR PERIPHERAL HARDWARE DEVICES

FIELD OF THE INVENTION

The present invention embraces a system for establishing secure communication channels for peripheral hardware devices.

BACKGROUND

General purpose virtual networks like virtual private networks (VPNs) or hosted virtual desktops (HVDs) are blunt objects with set parameters for processing and transmitting interaction data. When personal, consumer-grade or professional grade peripheral hardware devices like high quality video cameras and microphones are connected to servers through virtual network systems, the quality of the functions of the peripheral hardware devices diminishes. As such, the general purpose virtual networks create a subpar end user experience, as compared to what the end users expect from their high quality peripheral hardware devices. As such, a need exists to allow for peripheral hardware devices to be connected to the servers of virtual network systems through a separate and secure communication channel dedicated to the peripheral hardware device(s) so that the quality of the hardware device and the expected user experience is not diminished. This invention could be used by a managing entity to ensure remote users can use high quality peripheral devices in a secure manner through communication channels that can be managed and monitored by the managing entity, and also allows the managing entity to lock the peripheral hardware devices into specific interactions such that the peripheral hardware devices are dedicated to a specified interaction for as long as the peripheral hardware devices remain connected to the interaction.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the present invention address the above needs and/or achieve other advantages by providing apparatuses (e.g., a system, computer program product and/or other devices) and methods for establishing secure communication channels for peripheral hardware devices. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve receiving, via a computing device system comprising at least one peripheral hardware device, a request to begin a virtual interaction between the computing device system and a virtual network system configured to establish connections and transmit information across or between systems. The system may then establish the virtual interaction via a first communication channel. Next, the system may receive, via the computing device system, a request to establish a second communication channel, wherein the second communication channel comprises a direct communication channel between the at least one peripheral hardware device and the virtual network system that is separate and distinct from the first communication channel. The system may then establish, via an interaction management application, the second communication channel between the at least one peripheral hardware device and the virtual network system.

In some embodiments, the first communication channel of the system comprises a general-purpose communication channel comprising standard data transfer parameters for the virtual network system between the computing device system and the virtual network system. Additionally or alternatively, the second communication channel of the system may comprise a communication channel dedicated to the at least one peripheral hardware device with data transfer parameters optimized for the full technical performance of the at least one peripheral hardware device.

The system may, in some embodiments, monitor, via the interaction management application, the first communication channel for disruptions to the security parameters of the first communication channel at a predetermined frequency. The system may then detect, via the interaction management application, a disruption to the security parameters of the first communication channel. In response to detecting the disruption to the security parameters of the first communication channel, the system may (i) terminate, via the interaction management application, the first communication channel between the computing device system and the virtual network system, and (ii) transmit, via the interaction management application, an alert notification to a display of the computing device system.

Additionally or alternatively, the system may monitor, via the interaction management application, the second communication channel for disruptions to the security parameters of the second communication channel at a predetermined frequency. In such embodiments, the system may detect, via the interaction management application, a disruption to the security parameters of the second communication channel. In response to detecting the disruption to the security parameters of the second communication channel may (i) terminate, via the interaction management application, the second communication channel between the at least one peripheral hardware device and the virtual network system, and (ii) transmit, via the interaction management application, an alert notification to a display of the computing device system.

In some embodiments, the system locks the at least one peripheral hardware device to its interaction with the second communication channel such that the at least one peripheral hardware device cannot be used outside of the interaction for as long as the second communication channel is active. The system may then monitor, via the interaction management application, the at least one peripheral hardware device at a predetermined frequency to detect a new communication channel other than the second communication channel established between the at least one peripheral hardware device and any network or system not managed by the management application. In response to detecting the new communication channel, the system may terminate, via the interaction management application, the new communication channel such that the peripheral hardware device is restricted from being used outside the second communication channel.

The system may, in some embodiments, determine that the at least one peripheral hardware device has been connected to the computing device system. In response to determining that the at least one peripheral hardware device has been connected to the computing device system, the system may transmit a request for authentication credentials associated with the interaction management application to the computing device system. The system may then receive, from the computing device system, the authentication credentials and determine that the received authentication credentials match known authentication credentials associated with the interaction management application. In response to determining that the received authentication credentials match the known authentication credentials, the system may authorize the at least one peripheral hardware device to connect with the second communication channel.

In some embodiments of the system, the interaction management application comprises mechanisms for termination of peripheral hardware device channels. In such embodiments, the system may further be configured to determine that the virtual interaction has ended and automatically terminate, via the interaction management application, the second communication channel in response to determining that the virtual interaction has ended.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
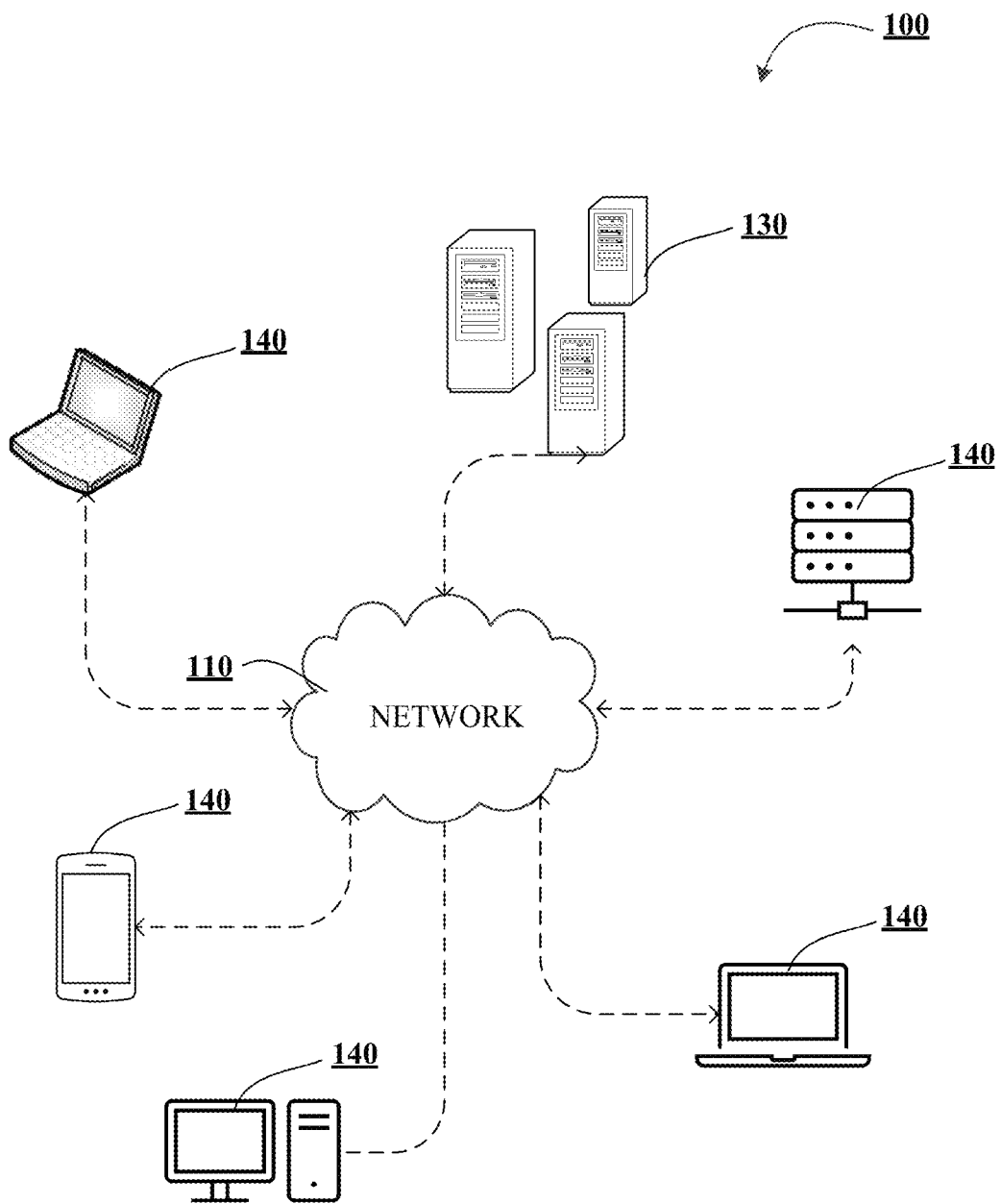
Figure 1B:
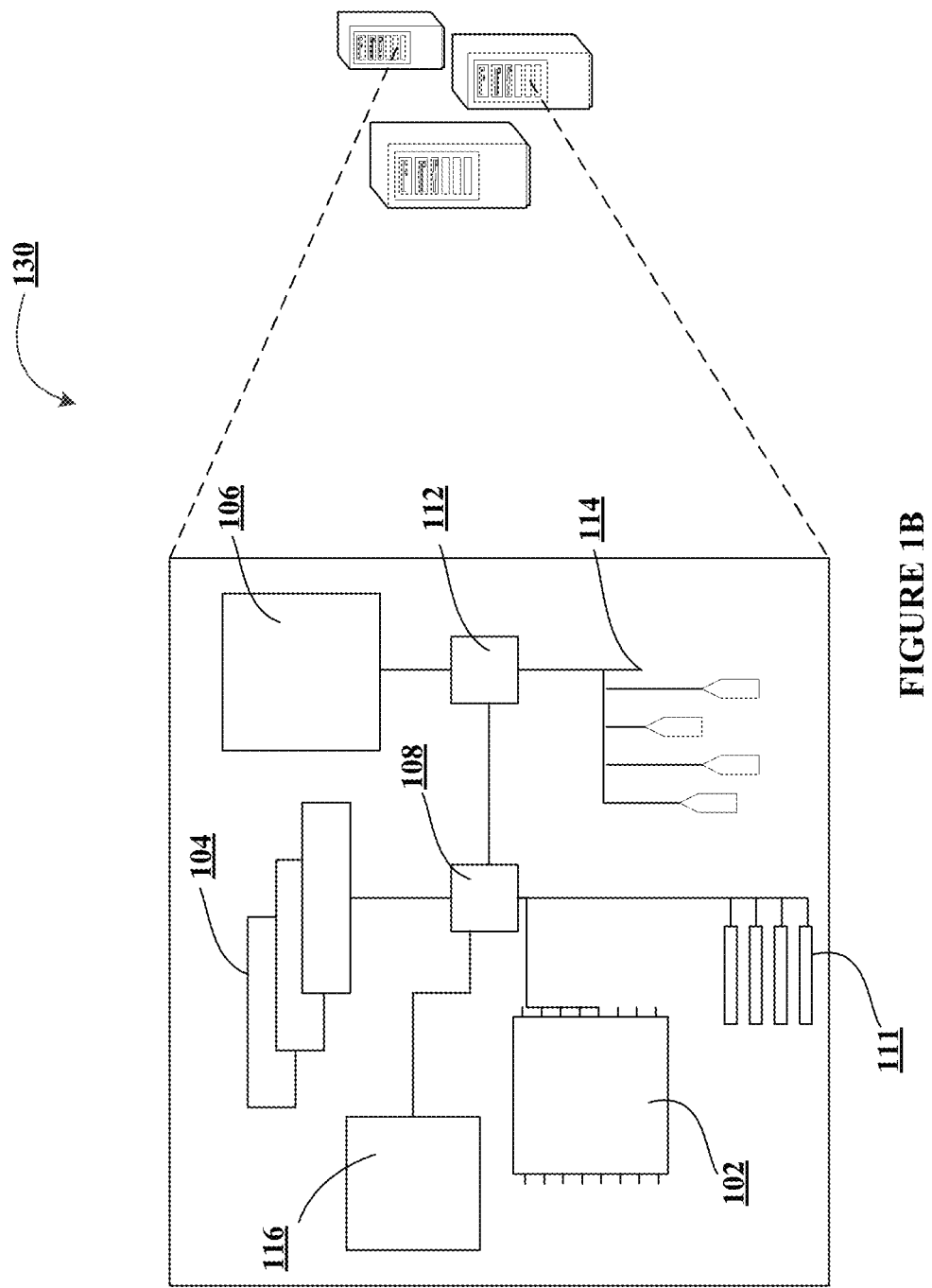
Figure 2:
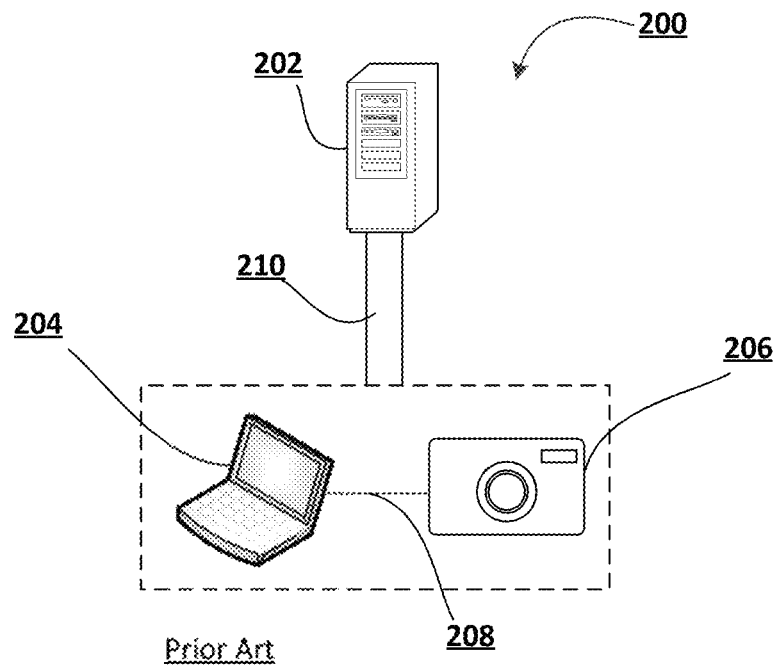
Figure 3:
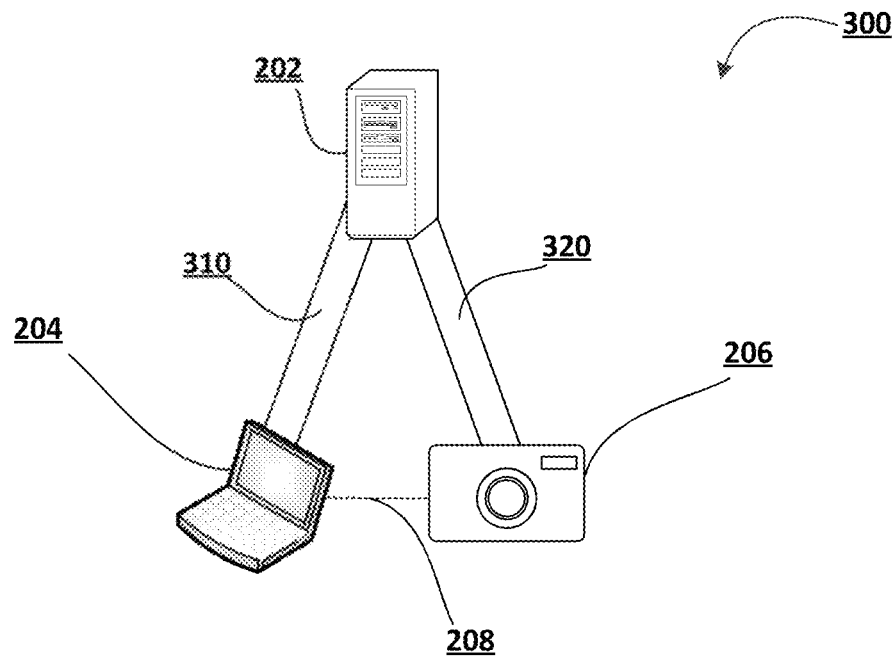
Figure 4:
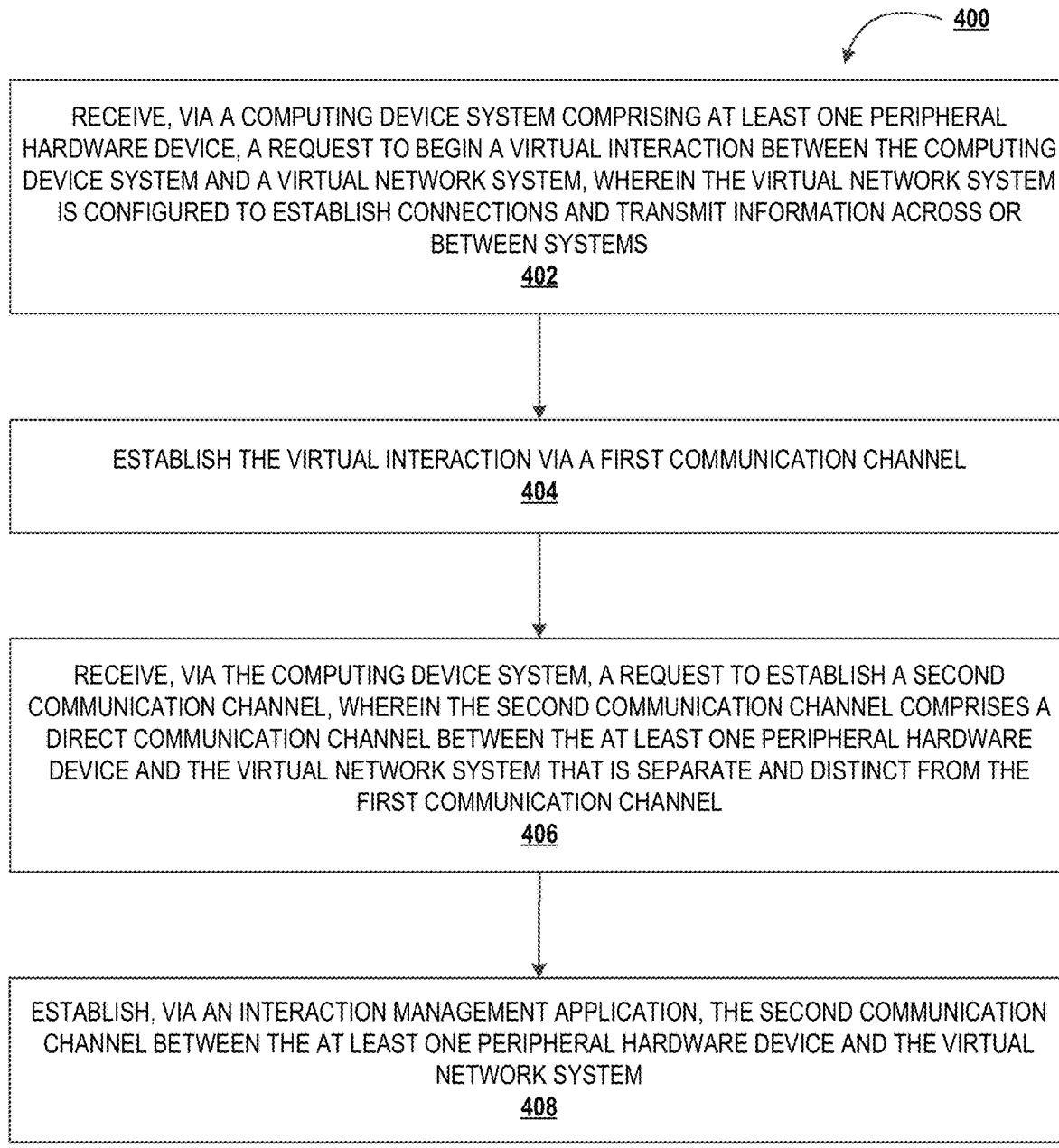

Having thus described embodiments of the invention in general terms, reference will now be made the accompanying drawings, wherein:

FIGS. 1A-1C illustrates technical components of an exemplary distributed computing environment for establishing secure communication channels for peripheral hardware devices, in accordance with an embodiment of the invention;

FIG. 2 illustrates a prior art environment for establishing a single general purpose communication channel between a network server and a computing device system;

FIG. 3 illustrates a system environment for establishing secure communication channels for peripheral hardware devices, in accordance with an embodiment of the invention; and FIG. 4 illustrates a process flow for establishing secure communication channels for peripheral hardware devices, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system.

In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

This system allows for a secure native interaction between peripheral hardware devices and virtual network servers that are separate, distinct, and optimized for the peripheral hardware devices in a way that enhances an end user's virtual interactions.

As remote and virtual connection programs gain more traction, users desire to use their own personal hardware devices, such as webcams and microphones, for virtual interactions. However, the general, one-size-fits-all nature of virtual network systems that implement a single communication channel for transferring all data, signals, and information that is exchanged in a virtual interaction often does not meet the technical specifications of these peripheral hardware devices. For example, a general purpose communication channel may need to degrade the speed, quality, resolution, quantity, or overall size of the data packets that a particular peripheral hardware device is capable of transmitting. For example, where users need to connect to an entity's servers through secure networks like VPNs or HVDs, peripheral hardware devices connected to a common, general virtual communication channel to the secure network would not function as well as they would outside of them. As such, the end user may experience lag, reduced audio quality, reduced video quality, reduced resolution, and the like within a virtual network, as compared to the actual product specifications and capabilities of the peripheral hardware devices that these end users use.

The system described herein allows a user's general computing device to connect to a virtual network system, while establishing a separate, optimized communication channel between a user's peripheral hardware device and the same virtual network system in a secure manner. The resulting interaction allows a seamless and singular user experience with the virtual network system that meets the specifications and capabilities of the peripheral hardware device. The system would establish a secure connection between the peripheral hardware device and the virtual interaction in a way that would optimize the peripheral hardware device's features and functions, and the connection can be monitored for security and optimization purposes.

Accordingly, the present invention may involve receiving a request to begin a virtual interaction between a computing device system and a virtual network system. A virtual interaction begins with the establishment of a general communication channel (i.e., the typical, general virtual network). A request is received to establish a direct communication channel between a peripheral hardware device and the virtual network system, where this direct peripheral hardware device channel has data transfer parameters that are optimized for the full technical performance of the peripheral hardware device. In some embodiments, this "request" may be an automatic initiation of the process to establish an optimized and dedicated communication channel for the peripheral device.

The peripheral hardware device communication channel is then established and monitored by an interaction management application (e.g., an application similar to a device manager). The interaction management application can lock the peripheral device into the virtual network interaction, so the interaction is secured from endpoint to endpoint, and the peripheral device is restricted from being used outside of this dedicated communication channel.

The interaction management application can then monitor the status of the peripheral hardware device, the peripheral hardware device's dedicated communication channel, and other aspects of the interaction to determine if certain security parameters are triggered. If certain security parameters are triggered, the interaction management application terminates the peripheral device's channel. In this way, the system allows an end user to use their peripheral hardware devices, such as a USB web camera or the like to create a dedicated peripheral device communication channel that has a symbiotic relationship with a general purpose communication channel of a virtual interaction, where the peripheral hardware device communication channel that is securable and locked into the virtual interaction.

What is more, the present invention provides a technical solution to a technical problem. As described herein, the technical problem includes the less-than-optimal functioning of consumer or professional grade peripheral hardware devices when used within a secure network system (particularly when such virtual network would otherwise comprise a single, general purpose communication channel). The technical solution presented herein allows for the peripheral hardware devices to connect to virtual network systems directly and in a secure manner without having to connect through the general-purpose communication channel, while still communicating information, data, signals, and content as part of the same virtual interaction. In particular, establishing a separate, direct, optimized, and secure communication channel between the peripheral hardware device and the virtual network system is an improvement over existing solutions to peripheral hardware devices connecting through the singular and general-purpose and/or low quality communication channels of general virtual network system interactions, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for establishing secure communication channels for peripheral hardware devices 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, digital cameras, webcams, microphones, amplifiers, distorters, scanners, printers, projectors, speakers, CD/DVD-drives, authentication devices, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, and the like) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an example of a prior art system environment 200 for establishing a virtual network connection with a computing device 204 and a peripheral hardware devices 206. As shown in FIG. 2, a general communication channel 210 is established between a virtual network server 202 and a combination of a computing device system 204 and peripheral hardware device 206.

In the prior art system environment 200, data that is being transferred to and from both the computing device system 204 and the peripheral hardware device 206 is processed by the one general purpose communication channel 210. The general purpose communication channel 210 is a blunt communication channel, meaning that it has standard communication parameters that are adequate for communicating audio, video, and similar data at an "acceptable," but not optimal, quality. As a result, the general communication channel could be processing audio input and output, video input and output, and display information, among various other types of possible data all at once, thus diminishing the quality of that data and the speed at which it is processed as well.

The general communication channel 210 will re-format the data from the peripheral hardware device 206 into a format and quality that the general communication channel 210 is capable of processing. If the peripheral hardware device 206 has data quality specifications that go beyond the capabilities of the general communication channel 210, when the peripheral hardware device 206 data is pushed through the single general communication channel 210, the general communication channel 210 will re-format and degrade the data output of the peripheral hardware device 206 to be of lesser quality. This creates a degraded, or less desired user experience for the end user's virtual interaction that is hosted by the virtual network server 202.

FIG. 3 illustrates a system environment 300 for establishing secure communication channels for peripheral hardware devices, in accordance with an embodiment of the invention. As shown in FIG. 3, a first, primary communication channel 310 is established between the virtual network server 202 and the computing device 204. A second, distinct, peripheral hardware device communication channel 320 is also established between the virtual network server 202 and the peripheral hardware device 206. An interaction management application monitors a connection 208 between the computing device 204 and the peripheral hardware device 206.

Unlike the prior art system environment 200 (FIG. 2), this system environment 300 has a communication channel, and one or more peripheral hardware device channels 320 dedicated to each peripheral hardware device of an end user (only one peripheral hardware device 206 is illustrated in FIG. 3). Thus, instead of a single general communication channel 210 processing the data of each peripheral hardware device 206 along with the computing device system 204, each peripheral hardware device communication channel 320 would process only the data associated with its associated peripheral hardware device 206. This ensures that the data, information, and signals of the peripheral hardware device 206 is processed at better speeds without compromising the quality of such peripheral devices 206.

Additionally or alternatively, the peripheral hardware device communication channel 320 may be specially configured to meet or exceed the technical specification and capabilities of the peripheral hardware device 206 to which it is connected. For example, an end user may have a high definition camera as the peripheral hardware device 206 that is connected by USB connection (i.e., the connection 208) to the computing device system 204. The interaction management application of the computing device system 204 may detect the technical specifications or capabilities of the high definition camera (e.g., the maximum spatial resolution, data packet size, refresh rate, frame rate, image size, required bandwidth, and the like) to determine the analogous specifications of the peripheral hardware device communication channel 320.

The interaction management application and/or the virtual network server 202 can then establish the appropriate peripheral hardware device communication channel 320 that has the capability of receiving, processing, and transmitting the data, signals, and other information of the peripheral hardware device 206 (i.e., the high resolution camera in this example). As such, the virtual network server 202 will receive the data, signals, and other information of the peripheral hardware device 206 at the optimal quality, without it having been degraded. The virtual network server 202 can then transmit a higher-quality image or video to all computing devices (including, in some embodiments, the computing device system 204) that are part of the virtual interaction, as compared to the prior art example of FIG. 2.

Furthermore, the system can encrypt the peripheral hardware device communication channel 320, and such encryption may be different from encryption that is used for the general communication channel 310. In some embodiments, the system may use a stricter or more complex encryption method for securing and protecting the data being transferred through the peripheral hardware device communication channel 320. For example, the peripheral hardware device 206 may comprise a device that is specially configured to transfer authentication data of a user, and therefore should have stricter and/or more complex encryption processes in place to protect the information.

The peripheral hardware device communication channel 320, once established by this system, continually monitors the peripheral hardware device communication channel 320 for any disruptions or interference to the peripheral hardware device communication channel 320. Upon detecting any such disruption or interference, the system will immediately terminate the peripheral hardware device communication channel 320, thus disconnecting the direct link between the peripheral hardware device 206 and the virtual network server 202. In this way, the system ensures the peripheral hardware device communication channel 320 remains secure while connecting the peripheral hardware device 206 and the virtual network server 202.

The system also continually monitors the peripheral hardware device 206 for any new communication channels opened between the peripheral hardware device and any other network, server, device, or interaction while the peripheral hardware device communication channel 320 is active. Upon detecting any new communication channel or other unexpected activity, the system can immediately terminate the peripheral hardware device communication channel 320, such that the peripheral hardware device communication channel 320 is the only channel active with respect to the peripheral hardware device 206. In this way, the system ensures that the peripheral hardware device 206 is locked into the peripheral hardware device communication channel 320 until that connection is terminated.

Referring now to FIG. 4, a flowchart is provided to illustrate one embodiment of a process 400 for establishing secure communication channels for peripheral hardware devices, in accordance with embodiments of the invention. In some embodiments, the process 400 may include block 402, where the system receives, via a computing device system comprising at least one peripheral hardware device, a request to begin a virtual interaction between the computing device system and a virtual network system, wherein the virtual network system is configured to establish connections and transmit information across or between systems.

In some embodiments, the process 400 includes block 404, where the system establishes the virtual interaction via a first communication channel. The first communication channel may, in some embodiments, comprise a general-purpose communication channel comprising standard data transfer parameters for the virtual network system between the computing device system and the virtual network system. As described herein, the general-purpose communication channel may be like the general communication channel 210 of FIG. 2. As such, the general-purpose communication channel may be configured to process a standard set of communication parameters, but is not optimized for any particular communication device (e.g., a high definition camera, a high quality microphone, or the like).

Additionally, in some embodiments, the process 400 includes block 406, where the system receives, via the computing device system, a request to establish a second communication channel, wherein the second communication channel comprises a direct communication channel between the at least one peripheral hardware device and the virtual network system that is separate and distinct from the first communication channel.

The second communication channel may comprise a communication channel dedicated to the at least one peripheral hardware device with data transfer parameters optimized for the full technical performance of the at least one peripheral hardware device. As such, the second communication channel may be the same as the peripheral hardware device communication channel 320 described with respect to FIG. 3. In such embodiments, this second communication channel may be configured to meet or exceed the processing specifications of the peripheral hardware device to which it is connected or otherwise associated.

The system may require device and/or user authorization or authentication before it will begin to establish the second communication channel. This provides a secure method of registering the peripheral hardware device with the interaction management application, which the managing entity can control. For example, an end user may pre-register themselves and/or a peripheral hardware device with a managing entity application (or the interaction management application) by providing authentication credentials, peripheral hardware device specifications, and similar information to the managing entity application that allows the managing entity application to both authenticate a user (and its computing device system and peripheral hardware device(s)) for utilizing the process(es) described herein, and to determine the optimized type, size, and other requirements of the second communication channel that will be connected between a virtual network server and the peripheral hardware devices.

As such, the system may determine that the at least one peripheral hardware device has been connected to the computing device system. In response to determine that the at least one peripheral hardware device has been connected to the computing device system, the system may automatically transmit a request for authentication credentials, as previously defined herein, associated with an interaction management application to the computing device system.

In some embodiments, the computing device system and/or the peripheral hardware device have already been authenticated, approved, or otherwise authorized to utilize the multiple communication channels as described herein. As such, the step of "receiving" a request to establish the second communication channel may be an automatic triggering response to the system detecting the presence of the peripheral hardware device. For example, if a user's peripheral high definition camera has been pre-authorized by the system, then the system can determine that the virtual interaction has been request (or has begun) and automatically trigger the request (or even initiate) the establishment of the second communication channel that will be dedicated to the peripheral hardware device.

The system may then receive, from the computing device system, the authentication credentials and can determine that the received authentication credentials match known authentication credentials associated with the interaction management application. In response to determining that the received authentication credentials match the known authentication credentials, the system may authorize the at least one peripheral hardware device to connect with the second communication channel, and move forward with establishing the second communication channel.

Finally, the process 400 may continue to block 408, where the system establishes, via an interaction management application, the second communication channel between the at least one peripheral hardware device and the virtual network system. As described above, the second communication channel may comprise one or more of the embodiments of the peripheral hardware device communication channel 320 described with respect to FIG. 3.

The system may, in some embodiments, monitor, via the interaction management application, the first communication channel for disruptions to certain security parameters of the first communication channel at a predetermined frequency. Examples of the security parameters that may be monitored include, but are not limited to, a detection that the computing device system has changed locations, has shut down, has opened other applications than the virtual interaction, shows signs of lagging or otherwise is not processing information quickly enough, or that the first communication channel is being accessed by a new or non-authorized device, is having difficulties processing the information or data being communicated to it by the virtual network system and/or the computing device system, or the like.

The system may then detect, via the interaction management application, a disruption to the security parameters of the first communication channel. In response to detecting the disruption to the security parameters of the first communication channel, the system may terminate, via the interaction management application, the first communication channel between the computing device system and the virtual network system.

Additionally or alternatively, the system may transmit, via the interaction management application, an alert notification to a display of the computing device system. This alert may allow an end user to either address the issue, re-connect to the virtual network system with a new and secure communication channel (or set of communication channels), or the like.

Similar to the above-steps for monitoring the first communication channel, the system may additionally or alternatively monitor the second communication channel (i.e., a separate, dedicated peripheral hardware device communication channel that is optimized to the specifications of the peripheral hardware device. As such, the system may monitor, via the interaction management application, the second communication channel for disruptions to the security parameters of the second communication channel at a predetermined frequency. The system may then detect, via the interaction management application, a disruption to the security parameters of the second communication channel. In response to detecting the disruption to the security parameters of the second communication channel, the system may terminate, via the interaction management application, the second communication channel between the at least one peripheral hardware device and the virtual network system. Additionally or alternatively, in response to detecting the disruption to the security parameters of the second communication channel, the system may transmit, via the interaction management application, an alert notification to a display of the computing device system.

Examples of security parameters for the peripheral hardware device and/or the second communication channel include, but are not limited to, a detection that the peripheral hardware device has changed locations, has shut down, is being accessed by other applications than those that are taking part in the virtual interaction, shows signs of lagging or otherwise is not processing or providing information or data quickly enough, or that the second communication channel is being accessed by a new or non-authorized device, is having difficulties processing the information or data being communicated to it by the virtual network system and/or the peripheral hardware device, or the like. The security parameters for the first communication channel or the general communication channel and the security parameters for the second communication channel or the peripheral hardware device channel may be the same in some instances and may vary in others. The system may monitor one or both of the channels in either case.

Part of the system's measures for securing the second communication channel may comprise locking the at least one peripheral hardware device to its interaction with the second communication channel such that the at least one peripheral hardware device cannot be used outside of the interaction for as long as the second communication channel is active.

Once the one or more peripheral hardware devices are locked to their interaction(s), the system may monitor, via the interaction management application, the at least one peripheral hardware device at a predetermined frequency to detect a new communication channel other than the second communication channel established between the at least one peripheral hardware device and any network or system not managed by the management application.

In response to detecting the new communication channel, the system may terminate, via the interaction management application, the new communication channel such that the peripheral hardware device is restricted from being used outside the second communication channel.

In some embodiments, the interaction management application comprises mechanisms for termination of peripheral hardware device channels. In such embodiments, the system can be configured to determine that the virtual interaction has ended. In response to determining that the virtual interaction has ended, the system may automatically terminate, via the interaction management application, the second communication channel in response to determining that the virtual interaction has ended.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for establishing secure communication channels for peripheral hardware devices, the system comprising:
    a virtual network system configured to establish connections and transmit information across or between systems;
    a computing device system comprising at least one peripheral hardware device;
    an interaction management application;

at least one non-transitory storage device; and at least one processor coupled to the at least one non-transitory storage device, wherein the at least one processor is configured to:
  receive, via the computing device system, a request to begin a virtual interaction between the computing device system and the virtual network system;
  establish the virtual interaction via a first communication channel;
  receive, via the computing device system, a request to establish a second communication channel, wherein the second communication channel comprises a direct communication channel between the at least one peripheral hardware device and the virtual network system that is separate and distinct from the first communication channel;
  establish, via the interaction management application, the second communication channel between the at least one peripheral hardware device and the virtual network system;
  lock the at least one peripheral hardware device to its interaction with the second communication channel such that the at least one peripheral hardware device cannot be used outside of the interaction for as long as the second communication channel is active;
  monitor, via the interaction management application, the at least one peripheral hardware device at a predetermined frequency to detect a new communication channel other than the second communication channel established between the at least one peripheral hardware device and any network or system not managed by the management application; and
  in response to detecting the new communication channel, terminate, via the interaction management application, the new communication channel such that the peripheral hardware device is restricted from being used outside the second communication channel.

2. The system of claim 1, wherein the first communication channel comprises a general-purpose communication channel comprising standard data transfer parameters for the virtual network system between the computing device system and the virtual network system.

3. The system of claim 1, wherein the second communication channel comprises a communication channel dedicated to the at least one peripheral hardware device with data transfer parameters optimized for the full technical performance of the at least one peripheral hardware device.

4. The system of claim 1, wherein the at least one processor is further configured to:
  monitor, via the interaction management application, the first communication channel for disruptions to the security parameters of the first communication channel at a predetermined frequency;
  detect, via the interaction management application, a disruption to the security parameters of the first communication channel; and
  in response to detecting the disruption to the security parameters of the first communication channel:
    terminate, via the interaction management application, the first communication channel between the computing device system and the virtual network system; and
    transmit, via the interaction management application, an alert notification to a display of the computing device system.

5. The system of claim 1, wherein the at least one processor is further configured to:
  monitor, via the interaction management application, the second communication channel for disruptions to the security parameters of the second communication channel at a predetermined frequency;
  detect, via the interaction management application, a disruption to the security parameters of the second communication channel; and
  in response to detecting the disruption to the security parameters of the second communication channel:
    terminate, via the interaction management application, the second communication channel between the at least one peripheral hardware device and the virtual network system; and
    transmit, via the interaction management application, an alert notification to a display of the computing device system.

6. The system of claim 1, wherein the at least one processor is further configured to:
  determine that the at least one peripheral hardware device has been connected to the computing device system;
  in response to determine that the at least one peripheral hardware device has been connected to the computing device system, transmit a request for authentication credentials associated with the interaction management application to the computing device system;
  receive, from the computing device system, the authentication credentials;
  determine that the received authentication credentials match known authentication credentials associated with the interaction management application; and
  in response to determining that the received authentication credentials match the known authentication credentials, authorize the at least one peripheral hardware device to connect with the second communication channel.

7. The system of claim 1, wherein the interaction management application comprises mechanisms for termination of peripheral hardware device channels; and
  wherein the at least one processor is further configured to:
    determine that the virtual interaction has ended; and
    automatically terminate, via the interaction management application, the second communication channel in response to determining that the virtual interaction has ended.

8. A computer program product for establishing secure communication channels for peripheral hardware devices, the computer program product comprising a non-transitory computer-readable medium comprising code causing an apparatus to:
  receive, via a computing device system comprising at least one peripheral hardware device, a request to begin a virtual interaction between the computing device system and a virtual network system configured to establish connections and transmit information across or between systems;
  establish the virtual interaction via a first communication channel;
  receive, via the computing device system, a request to establish a second communication channel, wherein the second communication channel comprises a direct communication channel between the at least one peripheral hardware device and the virtual network system that is separate and distinct from the first communication channel;

establish, via an interaction management application, the second communication channel between the at least one peripheral hardware device and the virtual network system;

lock the at least one peripheral hardware device to its interaction with the second communication channel such that the at least one peripheral hardware device cannot be used outside of the interaction for as long as the second communication channel is active;

monitor, via the interaction management application, the at least one peripheral hardware device at a predetermined frequency to detect a new communication channel other than the second communication channel established between the at least one peripheral hardware device and any network or system not managed by the management application; and in response to detecting the new communication channel, terminate, via the interaction management application, the new communication channel such that the peripheral hardware device is restricted from being used outside the second communication channel.

9. The computer program product of claim 8, wherein the first communication channel comprises a general-purpose communication channel comprising standard data transfer parameters for the virtual network system between the computing device system and the virtual network system.

10. The computer program product of claim 8, wherein the second communication channel comprises a communication channel dedicated to the at least one peripheral hardware device with data transfer parameters optimized for the full technical performance of the at least one peripheral hardware device.

11. The computer program product of claim 8, wherein the apparatus is further configured to:
monitor, via the interaction management application, the first communication channel for disruptions to the security parameters of the first communication channel at a predetermined frequency;
detect, via the interaction management application, a disruption to the security parameters of the first communication channel; and
in response to detecting the disruption to the security parameters of the first communication channel:
terminate, via the interaction management application, the first communication channel between the computing device system and the virtual network system; and
transmit, via the interaction management application, an alert notification to a display of the computing device system.

12. The computer program product of claim 8, wherein the apparatus is further configured to:
monitor, via the interaction management application, the second communication channel for disruptions to the security parameters of the second communication channel at a predetermined frequency;
detect, via the interaction management application, a disruption to the security parameters of the second communication channel; and
in response to detecting the disruption to the security parameters of the second communication channel:
terminate, via the interaction management application, the second communication channel between the at least one peripheral hardware device and the virtual network system; and transmit, via the interaction management application, an alert notification to a display of the computing device system.

13. The computer program product of claim 8, wherein the apparatus is further configured to:
determine that the at least one peripheral hardware device has been connected to the computing device system;
in response to determine that the at least one peripheral hardware device has been connected to the computing device system, transmit a request for authentication credentials associated with the interaction management application to the computing device system;
receive, from the computing device system, the authentication credentials;
determine that the received authentication credentials match known authentication credentials associated with the interaction management application; and
in response to determining that the received authentication credentials match the known authentication credentials, authorize the at least one peripheral hardware device to connect with the second communication channel.

14. The computer program product of claim 8, wherein the interaction management application comprises mechanisms for termination of peripheral hardware device channels; and
wherein the at least one processor is further configured to:
determine that the virtual interaction has ended;
automatically terminate, via the interaction management application, the second communication channel in response to determining that the virtual interaction has ended.

15. A method for establishing secure communication channels for peripheral hardware devices, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
receiving, via a computing device system comprising at least one peripheral hardware device, a request to begin a virtual interaction between the computing device system and a virtual network system configured to establish connections and transmit information across or between systems;
establishing the virtual interaction via a first communication channel;
receiving, via the computing device system, a request to establish a second communication channel, wherein the second communication channel comprises a direct communication channel between the at least one peripheral hardware device and the virtual network system that is separate and distinct from the first communication channel;
establishing, via an interaction management application, the second communication channel between the at least one peripheral hardware device and the virtual network system;
locking the at least one peripheral hardware device to its interaction with the second communication channel such that the at least one peripheral hardware device cannot be used outside of the interaction for as long as the second communication channel is active;

monitoring, via the interaction management application, the at least one peripheral hardware device at a predetermined frequency to detect a new communication channel other than the second communication channel established between the at least one peripheral hardware device and any network or system not managed by the management application; and in response to detecting the new communication channel, terminating, via the interaction management application, the new communication channel such that the peripheral hardware device is restricted from being used outside the second communication channel.

16. The method of claim 15, wherein the method further comprises:

wherein the first communication channel comprises a general-purpose communication channel comprising standard data transfer parameters for the virtual network system between the computing device system and the virtual network system; and wherein the second communication channel comprises a communication channel dedicated to the at least one peripheral hardware device with data transfer parameters optimized for the full technical performance of the at least one peripheral hardware device.

17. The method of claim 15, wherein the method further comprises:

monitoring, via the interaction management application, the second communication channel for disruptions to the security parameters of the second communication channel at a predetermined frequency;

detecting, via the interaction management application, a disruption to the security parameters of the second communication channel; and in response to detecting the disruption to the security parameters of the second communication channel:

terminating, via the interaction management application, the second communication channel between the at least one peripheral hardware device and the virtual network system; and transmitting, via the interaction management application, an alert notification to a display of the computing device system.

\* \* \* \* \*